(12) United States Patent  
Balachandran et al.

(10) Patent No.: US 7,236,789 B2  
(45) Date of Patent: Jun. 26, 2007

(54) CHANNEL RATE AND PHYSICAL CHANNEL SELECTION IN WIRELESS COMMUNICATIONS NETWORKS

(75) Inventors: Krishna Balachandran, Morganville, NJ (US); Tingfang Ji, Highland Court, NJ (US); Joseph H. Kang, Belle Mead, NJ (US); James P. Seymour, Schaumburg, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 637 days.

(21) Appl. No.: 10/373,803

(22) Filed: Feb. 27, 2003

(65) Prior Publication Data

US 2004/0185864 A1 Sep. 23, 2004

(51) Int. Cl.
*H04Q 7/20* (2006.01)

(52) U.S. Cl. .................. 455/450; 455/451; 455/452.1; 455/452.2

(58) Field of Classification Search ................ 455/450, 455/452.2, 513, 67.11, 67.13, 115.1, 134, 455/226.3, 135, 226.2, 451, 452.1, 456.1; 370/373

See application file for complete search history.

(56) References Cited

U.S. PATENT DOCUMENTS

| | | | |
|---|---|---|---|
| 6,782,262 B1 * | 8/2004 | Lundborg | 455/449 |
| 2002/0061731 A1 * | 5/2002 | Takano et al. | 455/67.1 |
| 2002/0123349 A1 * | 9/2002 | Miyoshi et al. | 455/450 |
| 2003/0002460 A1 * | 1/2003 | English | 370/331 |
| 2003/0134655 A1 * | 7/2003 | Chen et al. | 455/522 |
| 2003/0210179 A1 * | 11/2003 | Dizaji et al. | 342/159 |
| 2005/0085254 A1 * | 4/2005 | Chuah et al. | 455/522 |
| 2006/0116081 A1 * | 6/2006 | Shah | 455/67.11 |

* cited by examiner

*Primary Examiner*—Duc M. Nguyen  
*Assistant Examiner*—Eric J Elcenko

(57) ABSTRACT

In the method for selecting a channel rate, link quality between the serving portion of the network and a mobile station is determined from at least one signal strength measurement. A channel rate is then selected based on the determined link quality. Also, a physical channel is assigned to the mobile station on a prioritized basis with respect to the selected channel rate.

12 Claims, 2 Drawing Sheets

CHANNEL RATE AND PHYSICAL CHANNEL SELECTION IN WIRELESS COMMUNICATIONS NETWORKS

BACKGROUND OF THE INVENTION

Cellular standards often specify physical channels that provide different radio link rates as units of quasi-static resource allocation for both circuit and packet mode services. For example, Full Rate (FR), Half Rate (HR) and Quarter Rate (QR) channels that provide radio link rates in the ratio 1:0.5:0.25, respectively, may be specified.

For example, GSM standards specify an adaptive multirate (AMR) speech codec with 8 distinct modes ranging from 4.75 to 12.2 kbps. AMR speech frames may be carried over full rate (FR) or half rate (HR) speech traffic channels that provide a radio link of 22.8 kbps and 11.4 kbps, respectively. With AMR, a GSM system may choose the combination of speech codec modes and channel rates to achieve the required quality of service with minimum system and radio resources. On the assigned traffic channel, AMR codec mode adaptation changes the level of source and channel coding to achieve the best speech quality under the prevailing channel conditions. In such cases where different physical channel rate options are provided, the system capacity and/or spectral efficiency may significantly vary depending on the frequency reuse employed, the mechanisms used for selecting these channels and switching or adapting between these channels.

Previous studies of half and full rate channel adaptation focused on the tradeoff between the grade of service (GOS) and system capacity. Allocating more half rate or quarter rate channels increases the total number of calls a system can admit. However, lower rate channels provide less protection than full rate channels for the same vocoder mode under poor channel conditions. Furthermore, switching between FR, HR and QR channels is treated as an intra-sector handover, and frequent switching may degrade speech quality on account of speech frame blanking that occurs during each handover.

Allocation and packing of half- and full rate channels have been investigated assuming the system is limited by channel availability (i.e., hard blocking) and not interference. Re-packing of half rate calls is shown to provide capacity benefits when the fraction of half rate users is large. However, speech frame blanking associated with re-packing and its impact on GOS have not been considered. Furthermore, hard blocking assumptions are not appropriate for tight reuse (i.e., 1/3 or 1/1) deployments.

After a channel rate has been selected, the network must select a physical channel for assignment or packing. If only one class of channel rates is available, assignment among available physical channels are typically performed randomly. In the presence of multiple classes of channel rates, however, this method of assignment may lead to an inefficient allocation of resources and may increase blocking rates.

SUMMARY OF THE INVENTION

Existing work on codec mode or data rate adaptation through modulation and coding scheme selection considers link quality measurements on the traffic channel. However, one of the challenges with channel rate allocation such as at call setup is the unavailability of suitable link quality determinations or estimates from traffic channel measurements reported by mobile stations. In the present invention, link quality determinations are derived from measurements on a broadcast control or beacon channel. By considering available measurements in different scenarios and the link quality metrics that can be derived from those measurements, channel rates are selected.

Channel rate selection in this manner improves network capacity while reducing per user hardware costs and maintains or improves individual user quality.

After a channel rate is selected, methods of channel assignment for lower rate channels are described to maximize the availability of higher rate channels for future assignment and to minimize blocking rates.

BRIEF DESCRIPTION OF THE DRAWINGS

The present invention will become more fully understood from the detailed description given below and the accompanying drawings, wherein like elements are represented by like reference numerals, which are given by way of illustration only and thus are not limiting on the present invention and wherein.

DETAILED DESCRIPTION OF EMBODIMENTS

Figure 1:
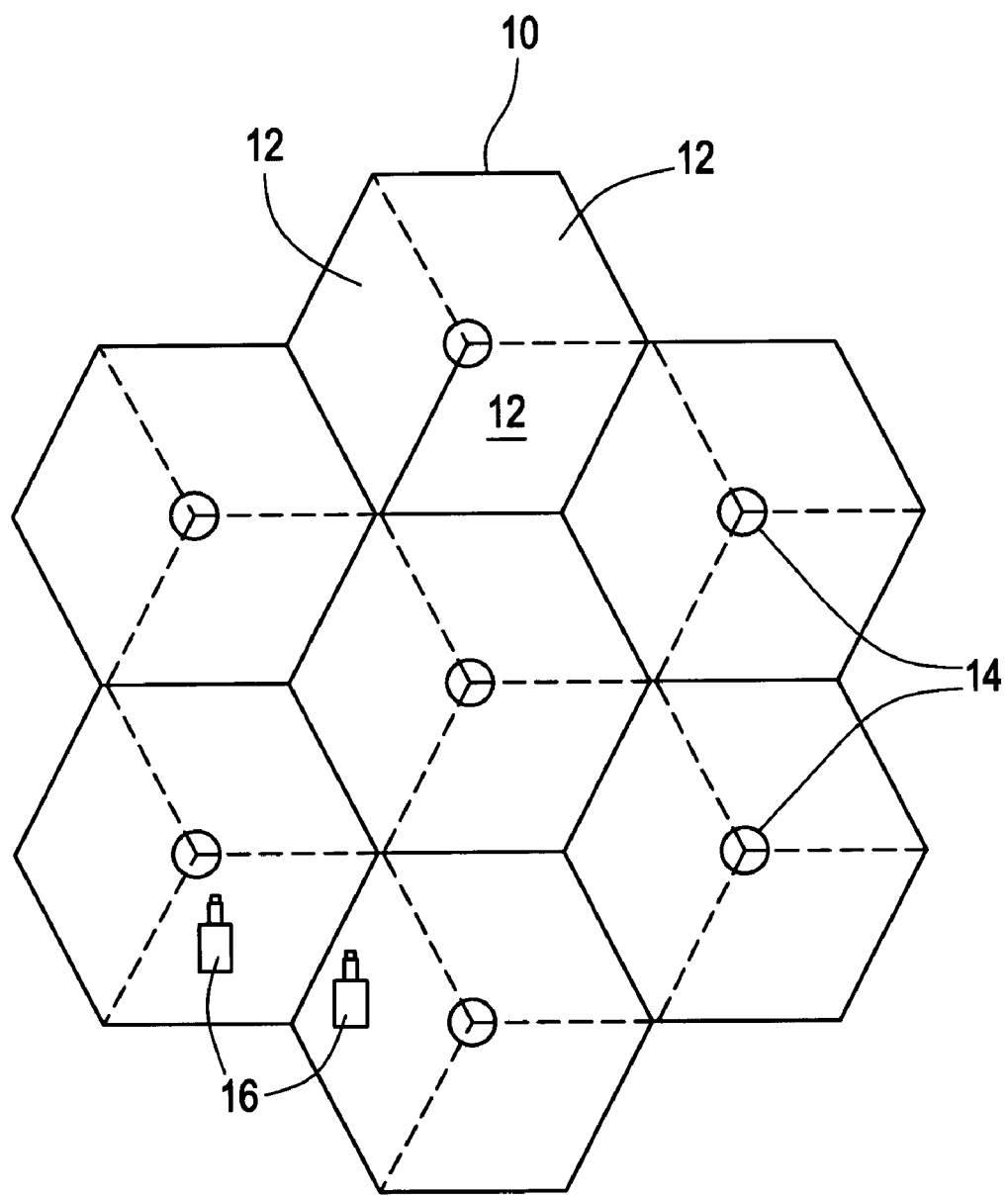
FIG. 1 illustrates a typical cell layout of a wireless communication system.

FIG. 1 illustrates a typical sectorized cell layout of a wireless communication system. Each cell 10 of the sectorized cell layout is divided into sectors 12 (e.g., 3 sectors in the example of FIG. 1). In a sectorized cell, directional antennas are associated with each sector. Non-sectorized cell layouts are also common. In these cell layouts, omnidirectional antennas are used, and sectors do not exist. In this disclosure, the term coverage area will be used to refer to both a sector and a cell (e.g., coverage area=sector/cell). Resources at a base station 14 are associated with each coverage area (sector in sectorized network or cell in non-sectorized network). The resources of a base station 14 serving the communication needs of a mobile station are commonly referred to as the serving sector/cell. For each coverage area associated with a base station 14, the base station 14 provides a plurality of channels for serving the communication needs of mobile stations 16. These channels include, but are not limited to, a number of broadcast channels and a number of traffic channels. A traffic channel is a channel set up between the mobile station and the base station to carry traffic (e.g., data or voice). For the purposes of this disclosure, a broadcast channel is a channel accessible by more than one mobile station and is generally (but not necessarily) transmitted at a known power (e.g., the broadcast control channel (BCCH) in GSM). There is at least one broadcast channel for each coverage area.

In cellular systems, mobile stations are required to measure at least one broadcast channel's signal strength (RxLEV) for sectors/cells specified on a neighbor list in order to facilitate sector/cell selection and handovers (e.g., measure the broadcast control channel or BCCH carrier signal strength in the case of GSM). The neighbor list is list of cell/sectors near, but not necessarily adjacent to the serving cell/sector. The measurements of the received broadcast signal strength for the serving cell/sector and L strongest neighbor cells/sectors are either periodically reported or reported on demand to the network (e.g., a base station 14 in the network). Also, the network may have the ability to request a mobile station to report additional measurements on a specified number of the strongest received broadcast channels and/or report measurements on received broadcast channels exceeding a certain threshold level. The parameters of these on demand measurements, such as the specified number and certain threshold level are design parameters set by the system operator.

Additionally, it is known that a base station 14 can infer these signal strength measurements based on measurements of uplink signals (mobile station to base station transmissions) made at the base station 14 and/or made at other base stations 14 and communicated to one of the base stations 14.

Since the traffic channel to be allocated is unknown at times, for example, such as at call setup, only signal strength measurements of the broadcast channel are available. The present invention provides a method of channel rate selection based on these broadcast channel signal strength measurements. As indicated by the simulation results presented below, the channel rate selection methodologies according to the present invention are extremely effective. This is due in part because the link quality on the traffic channels is strongly correlated with the broadcast channel since the distance loss and shadow fading are the same.

In tight re-uses, neighboring sectors/cells that were candidates for sector/cell selection can become dominant co-channel interferers if not selected. Hence in addition to providing the received signal strength of the serving sector/cell, the received signal strengths of nearby sectors/cells can be used to estimate co-channel interference. The following embodiments of rate selection methods according to the present invention employ received signal strength and/or estimated co-channel interference as metrics for selection. Also, the following embodiments are described with respect to a sectorized network, but it will be appreciated from this disclosure that the present invention and the embodiment described herein are equally applicable to a non-sectorized network.

First Embodiment: Serving Sector Signal Strength Based Rate Selection

Consider a case where only full rate (FR) and half rate (HR) channels are specified. A strongly received broadcast channel signal strength (RxLEV) implies that a HR channel may provide sufficient quality to the user. Therefore, given the received broadcast channel signal strength measurement C for the serving sector, a reasonable channel rate selection scheme performed at the base station based on the received broadcast signal strength measurement C received from the mobile station is as follows:

$$\text{Rate} = \begin{cases} FR & C < T_1 \text{ and } N_{FR} > 0 \\ HR & \text{otherwise} \end{cases} \quad (1)$$

where $T_1$ is a threshold determined by empirical study and $N_{FR}$ is the number of idle full rate channels in the sector.

In this embodiment, calls are packed onto half rate channels regardless of the link quality if there are no idle full rate channels available in the serving sector. Only users with poor signal strength are assigned to full rate channels; thus avoiding the need for constant repacking and the associated speech frame blanking.

If full rate (FR), half rate (HR) and quarter rate (QR) traffic channels are specified, then the rate selection scheme is as follows:

$$\text{Rate} = \begin{cases} FR, & C < T_1^{FR} \text{ and } N_{FR} > 0 \\ HR, & T_1^{FR} \le C < T_1^{HR} \text{ and } N_{HR} > 0 \\ QR, & \text{otherwise} \end{cases} \quad (2)$$

where $T_1^{FR}$ and $T_1^{HR}$ are thresholds determined by empirical study, $N_{FR}$ is the number of idle full rate channels and $N_{HR}$ is the number of idle half-rate channels in the sector.

Furthermore, this channel rate selection scheme can be generalized for a system with M channel rates, $\{R_1, R_2, \ldots, R_M\}$, $N_i$ idle channels of rate $R_i$, and M−1 signal strength selection thresholds, $\{T_1^1, T_1^2, \ldots, T_1^{M-1}\}$, where $R_1 > R_2 > \ldots > R_M$ and $T_1^1 < T_1^2 < \ldots < T_1^{M-1}$.

$$\text{Rate} = \begin{cases} R_1, & C < T_1^1 \text{ and } N_1 > 0 \\ R_2, & T_1^2 \le C < T_1^3 \text{ and } N_2 > 0 \\ \ldots & \ldots \quad \ldots \\ R_{M-1}, & T_1^{M-2} \le C < T_1^{M-1} \text{ and } N_M > 0 \\ R_M, & \text{otherwise} \end{cases} \quad (3)$$

Second Embodiment: $C/I_{agg}$ Based Rate Selection

In tight reuse deployments, co-channel interference plays a larger role than in sparse reuses. This second embodiment of the present invention considers co-channel interference in the selection of channel rates, and is particularly, applicable to tight reuse deployments. In this embodiment an interference level can be derived from the broadcast channel signal strength measurements reported by the mobile station for sectors other than the serving sector (i.e., interfering sectors). As described previously, the interfering sectors can be the sectors of cells on the neighbor list and/or can be the L strongest neighbor cells/sectors (where L is a design parameter chosen by the system designer).

In one exemplary embodiment, k interfering sectors are selected from the L interfering sectors, where k is less than or equal to L. For example, the L interfering sectors are ranked by signal strength, and the interfering sectors having the k highest signal strength measurements are selected. In another exemplary embodiment, k=L.

Assuming k interfering sectors, an aggregate interference level $I_{agg}$ may by calculated as the aggregate sum of the corresponding signal strength measurements for the k interfering sectors as shown below:

$$I_{agg} = \sum_{i=1}^{k} I_i$$

where $I_i$ is the broadcast channel signal strength level of the i-th interfering sector.

A weighted aggregate interference level can also be used. In this exemplary embodiment, the k broadcast channel signal strength measurements are ranked, and a weight w is applied to each broadcast channel signal strength measurement as shown below:

$$I_{agg} = \sum_{i=1}^{k} w_i I_i$$

As will be appreciated the weights w for each of the k broadcast channel signal strength measurements are design parameters set by the network operator, for example, based on empirical study.

Having determined the aggregate interference level $I_{agg}$, the rate selection scheme performed at the base station for the mobile station sending the received broadcast channel signal strength measurements may be specified as follows:

$$\text{Rate} = \begin{cases} FR & \frac{C}{Iagg} < T_2 \text{ and } N_{FR} > 0 \\ HR & \text{otherwise} \end{cases} \quad (4)$$

where $T_2$ is the threshold, determined by empirical study, for the signal-to-interference ratio determined in equation (4).

If full, half and quarter rate traffic channels are specified, then the channel rate selection scheme is as follows:

$$\text{Rate} = \begin{cases} FR, & \frac{C}{Iagg} < T_2^{FR} \text{ and } N_{FR} > 0 \\ HR, & T_2^{FR} \leq \frac{C}{Iagg} < T_2^{HR} \text{ and } N_{HR} > 0 \\ QR, & \text{otherwise} \end{cases} \quad (5)$$

where $T_2^{FR}$ and $T_2^{HR}$ are thresholds determined through empirical study, $N_{FR}$ is the number of idle full-rate channels and $N_{HR}$ is the number of idle half-rate channels in the sector.

Similar to the first embodiment, this second embodiment can also be generalized for a system with M channel rates in the following manner:

$$\text{Rate} = \begin{cases} R_1, & \frac{C}{Iagg} < T_2^1 \text{ and } N_1 > 0 \\ R_2, & T_2^2 \leq \frac{C}{Iagg} < T_2^3 \text{ and } N_2 > 0 \\ \ldots & \ldots \quad \ldots \\ R_{M-1}, & T_2^{M-2} \leq \frac{C}{Iagg} < T_2^{M-1} \text{ and } N_{M-1} > 0 \\ R_M, & \text{otherwise} \end{cases} \quad (6)$$

where $T_2^i$, for i=1 to M−1 are thresholds determined through empirical study, $N_i$ is the number of idle channels at rate $R_i$ in the sector.

For $C/I_{agg}$-based channel rate selection indicated in expressions (4)–(6), broadcast channel signal strength measurements may not be available for even a single co-channel interferer. According to a further aspect of this second embodiment, the base station receiving the broadcast channel measurements from the mobile station determines if the number of received broadcast channel measurements for interfering sectors exceeds a threshold number. If so, then the channel selection technique as discussed above with respect to the second embodiment is performed. However, if the number of broadcast channel measurements does not exceed the threshold number, then either a full rate channel can be selected or channel rate selection can be performed according to the first embodiment (expressions (1)–(3)). In one exemplary embodiment, the threshold number is set zero, but it will be appreciated that this is a design parameter set by the system operator.

Third Embodiment: $C/I_{est}$ Based Rate Selection

As previously discussed, mobile stations typically report the L strongest received broadcast channel levels from neighboring sectors. The large path-loss of second-tier neighbors is likely to bring the broadcast channel signal strength levels below those of the first-tier neighbors. Depending on L and the frequency reuse scheme employed in the wireless communication system, broadcast channel signal strength measurements from interfering sectors (i.e., sectors other than the serving sector) may be few and may not account for all strong co-channel interferers.

From the L reported measurements, a co-channel interference estimate can be derived as described below. In one exemplary embodiment, k interfering sectors are selected from the L interfering sectors, where k is less than or equal to L. For example, the L interfering sectors are ranked by signal strength, and the interfering sectors having the k highest signal strength measurements are selected. In another exemplary embodiment, k=L.

In one exemplary embodiment, from among the k interfering sectors $\{I_1, I_2, \ldots, I_k\}$, the base station chooses the maximum value, $I_{max}$ (i.e., dominant reported interferer) as the co-channel interference estimate $I_{est}$.

In an alternative exemplary embodiment, the co-channel interference estimate $I_{est}$ is established as the average broadcast channel signal strength level of the k interfering sectors. In yet another exemplary embodiment, the co-channel interference estimate $I_{est}$ is established as the median broadcast channel signal strength level of the k interfering sectors. It will be appreciated that numerous other statistical values based on the broadcast channel signal strength measurements for the k interfering sectors could be used to establish the co-channel interference estimate $I_{est}$.

The channel rate selection decision rule based on $C/I_{est}$ is then given by:

$$\text{Channel} = \begin{cases} FR & \frac{C}{I_{est}} < T_3 \text{ and } N_{FR} > 0 \\ HR & \text{otherwise} \end{cases} \quad (7)$$

where $T_3$ is the threshold of the signal-to-estimated interference ratio determined by empirical study and $N_{FR}$ is the number of idle full-rate channels.

If full, half and quarter rate traffic channels are specified, then the channel rate selection scheme is as follows:

$$\text{Rate} = \begin{cases} FR, & \frac{C}{I_{est}} < T_3^{FR} \text{ and } N_{FR} > 0 \\ HR, & T_3^{FR} \leq \frac{C}{I_{est}} < T_3^{HR} \text{ and } N_{HR} > 0 \\ QR, & \text{otherwise} \end{cases} \quad (8)$$

where $T_3^{FR}$ and $T_3^{HR}$ are thresholds (e.g., in dBm) determined by empirical study, $N_{FR}$ is the number of idle full-rate channels and $N_{HR}$ is the number of idle half-rate channels in the sector.

Similar to the first and second embodiments, this third embodiment can also be generalized for a system with M channel rates in the following manner:

$$\text{Rate} = \begin{cases} R_1, & \dfrac{C}{I_{est}} < T_3^1 \text{ and } N_1 > 0 \\ R_2, & T_3^2 \leq \dfrac{C}{I_{est}} < T_3^3 \text{ and } N_2 > 0 \\ \ldots & \ldots \\ R_{M-1}, & T_3^{M-2} \leq \dfrac{C}{I_{est}} < T_3^{M-1} \text{ and } N_{M-1} > 0 \\ R_M, & \text{otherwise} \end{cases} \quad (9)$$

For $C/I_{est}$-based channel rate selection indicated in expressions (7)–(9), broadcast channel signal strength measurements may not be available for even a single co-channel interferer. According to a further aspect of this third embodiment, the base station receiving the broadcast channel measurements from the mobile station determines if the number of received broadcast channel measurements for interfering sectors exceeds a threshold number. If so, then the channel selection technique as discussed above with respect to the third embodiment is performed. However, if the number of broadcast channel measurements does not exceed the threshold number, then either a full rate channel can be selected or channel rate selection can be performed according to the first embodiment (expressions (1)–(3)). In one exemplary embodiment, the threshold number is set zero, but it will be appreciated that this is a design parameter set by the system operator.

Fourth Embodiment: Channel Assignment for Lower Rate Channels

After a channel rate has been selected for communication with a mobile station, the network must determine a physical channel to assign that mobile station. Stated another, a determination is made as to in which physical channel the mobile station will be packed. A full rate physical channel can support transmission by one mobile station at full rate, can support transmission by two mobiles each at half rate, etc.

Assume a set of M channel rates, $(R_1, R_2, \ldots, R_M)$, with $R_1$ having the highest rate. If a channel rate, $R_i$ with $i>1$, is selected, random channel assignment among all available physical channels that can support rate $R_i$ may not be efficient. For lower rate channels, a prioritized channel assignment method according to the present invention may increase the availability of higher rate channels for future assignment.

In the prioritized channel assignment or packing method according to the present invention, physical channels that already support transmission at the selected channel rate, but which have additional capacity, are considered for assignment first. If no such channels are available, idle channels which can support progressively higher rates are considered. Stated another way, the method according to the present invention determines a physical channel currently supporting a mobile station at a channel rate closest to the selected channel rate and having capacity to support transmission at the selected channel rate; and assigns the mobile station to the determined physical channel.

For example, if the channel rate selection process selects a half rate for a first mobile station, then one of the physical channels already supporting a second mobile station at half rate, but having capacity to support another mobile station at half rate, is randomly assigned to support the first mobile station. By packing physical channels with similar rates in this manner, the availability of idle channels with higher rates is maximized. Namely, if an unused physical channel were selected for the first mobile station, this would result in two physical channels each supporting one mobile station at half rate. Consequently, neither of these two physical channels is then available to support a mobile station at full rate. However, the present invention would leave the unused physical channel unused and available to support a mobile station at full rate.

Simulation Assumptions and Results

Results from a performance evaluation of the above-described rate selection embodiments are presented here for an exemplary 1/3 frequency reuse GSM system with half and full rate channels.

25 cell layout in a 1/3 reuse with wraparound and cell separation of 1.5 km. Each cloverleaf-shaped cell consists of three hexagonal sectors.

Total spectrum for traffic is 2.4 MHz. In 1/3 reuse and 200 kHz carriers, this results in 4 carriers/sector.

Available channel rates are FR and HR. HR channel assignment employs the fourth embodiment method of prioritized channel assignment.

No power control was employed and base station transmit power was fixed at 43 dBm.

Path loss of $128.1+37.6*\log_{10}(d)$ dB, d in kilometers, and log normal shadow fading with 0 mean and $\sigma=7$ dB.

Antenna with 90 degree beamwidth and pattern from UMTS 30.03.

Noise floor of −114 dBm

Poisson arrivals of voice calls. Talkspurt and silence periods were exponentially distributed with a voice activity factor of 60%.

Typical urban (TU) multi-path channel profile

Pseudo-random frequency hopping with frequency separations greater than the coherence bandwidth. A block fading model is employed to model correlated fading, i.e., fast fading is considered constant over the block duration.

The MR74 AMR vocoder used in GSM was assumed. GMSK and 8-PSK modulation are assumed for full rate and half rate operation, respectively.

Receiver assumes no knowledge regarding channel state; instead, a 16 state MAP equalizer is employed.

System capacity is defined as the maximum offered load for which at least 90% of users have less than 1% FER and network blocking levels do not exceed 2%.

Simulations for the first embodiment assume that RxLEV is known without error or delay.

Simulations for the second embodiment assume that broadcast channel signal strength measurements from two tiers of co-channel interferers are known without error or delay.

Simulations for the third embodiment assume that the broadcast channel signal strength measurement from the dominant interferer among two tiers of co-channel interferers is known without error or delay Simulations are performed for a version of the third embodiment (hereinafter referred to as the "fourth case simulation") where L=6 and the dominant interferer is not assumed to be among those L measurements. If none of the L measurements are from a co-channel interferer, the first embodiment is employed.

Threshold settings for rate selection according to the present invention can affect the fraction of users assigned to FR/HR channels and the FER quality experienced by those users. In Table I, the limiting factor of the aggregated C/I based second embodiment is illustrated with different rate selection thresholds. When the rate selection threshold is set relatively high, a large fraction of users are allocated to FR channels. Since the number of FR channels that can be supported in each sector is quite limited, the network tends to be blocking limited. As shown in Table I, when T=50 dB, there are 99.1% FR users. Given an offered load of 26.2 Erlangs, the blocking probability is 4.9%, which exceeds the desired 2% blocking limit, while the fraction of good users (users with less than 1% FER) is better than the 90% requirement. As the threshold decreases, more users are allocated to HR channels. Since each FR channel can be split into 2 half rate channels, blocking due to unavailable channels is less likely to occur. Moreover, given the same transmitting power, a HR user also causes less interference to other users than a FR user does. However, HR users are more susceptible to noise and interference, and this susceptibility can result in poor FER performance. As shown in Table 1, when T=12 dB, 0% users are FR users. Given an offered load of 15.8 Erlangs/sector, there is no blocking observed while 90% of the users satisfy the 1% FER requirement. The best system performance is achieved when there is a significant fraction of HR users to ensure enough channels and less interference, yet only users in good channel condition are allocated to the less robust HR channels. As shown in Table I, when the thresholds are 12 and 15 dB, the offered load that can be supported is significantly larger than that in all HR or all FR cases.

TABLE I

Interference and blocking limited cases for aggregated C/I based rate selection algorithm

| | Threshold (dB) | | | |
|---|---|---|---|---|
| | −20 | 12 | 15 | 50 |
| Fraction of FR (%) | 0 | 45.5 | 58.2 | 99.1 |
| Offered Load (Erlangs/sector) | 15.8 | 34.8 | 32.3 | 26.2 |
| Satisfied Users (%) | 90.0 | 90.3 | 90.0 | 90.5 |
| Blocking Prob. (%) | 0.0 | 1.5 | 2.0 | 4.9 |
| Limiting Factor | Interference | Interference | Both | Blocking |

Figure 2:
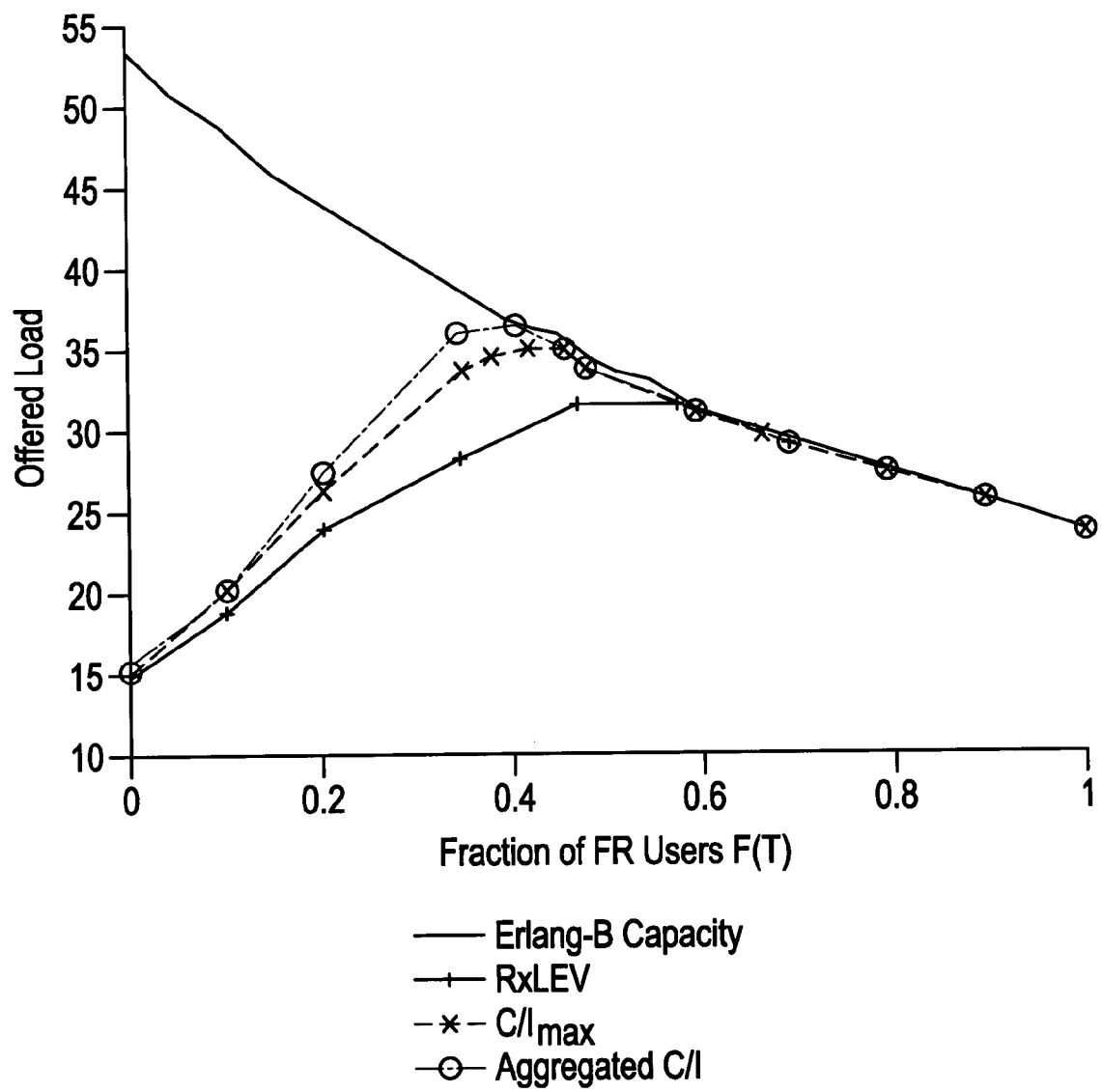
FIG. 2 illustrates offered loads supported by the first, second and third embodiments plotted against the fraction of full rate users.

In FIG. 2, the offered loads supported by the first, second and third embodiments are plotted against the fraction of full rate users (e.g., mobile stations). The optimization of the fourth case simulation is more difficult since two thresholds need to be tuned. While the fourth case simulation is not included in FIG. 2, its performance lies between that of the first and third embodiments and has parameters that are in the vicinity of the optimal parameters of first and third embodiments. We observe that when there is a large fraction of full rate users, the 2% blocking capacity and load curves from the simulations coincide. When the fraction of full rate users is small, the system is interference limited. Since the aggregated C/I is the most accurate indicator of interference level among the link quality metrics considered, it achieves the highest offered load while first embodiment achieves the lowest offered load.

The system capacity for each rate selection embodiment, obtained by optimizing the corresponding threshold, is listed in Table II. These may be compared with the system capacity of 23.7 Erl/Sector when only full rate channels are employed. The first embodiment as defined by expression (1) improves the network capacity by 32%. The second embodiment defined by expression (4), where $I_{agg}$ was determined as the sum of the received broadcast channel measurements for the k interfering sectors, improves the network capacity by 51%. The third embodiment defined by expression (7), where $I_{est}=I_{max}$, improves the network capacity by 47%. In the case where only 6 strongest broadcast channel signals are reported to the base station, a practical $C/I_{max}$ and RxLEV based hybrid approach (the fourth case simulation) yields a 38% capacity gain.

Note that these improvements are shown under low mobility conditions when there is no power control. In the absence of channel rate selection, power control does not improve the capacity of systems with 1/3 reuse since the capacity is block limited. By reducing co-channel interference, power control employed in conjunction with rate selection will enable further improvements over those listed in Table II. The capacity for the hybrid approach is 6% less than that of the $C/I_{max}$ based third embodiment as a result of the maximum interferer measurement being unavailable.

TABLE II

Capacity of systems in 1/3 reuse with different rate selection algorithms

| | Algorithm | | | |
|---|---|---|---|---|
| | A | B | C | D |
| Capacity (Erlang/sector) | 31.2 | 35.9 | 34.9 | 32.8 |
| Improvement over FR only | 31.9% | 51.4% | 47.3% | 38.4% |

The invention being thus described, it will be obvious that the same may be varied in many ways. For example, while the embodiments of the present invention were described with respect to a sectorized network, it will be appreciated that the present invention is equally applicable to a non-sectorized network. Such variations are not to be regarded as a departure from the spirit and scope of the invention, and all such modifications as would be obvious to one skilled in the art are intended to be included within the scope of the present invention.

We claim:

1. A method of assigning a physical channel rate to a mobile station in a wireless communication network including a plurality of sectors having full rate, half rate and quarter rate traffic channels, the method comprising:

receiving the broadcast channel strength of a serving sector for the mobile station;

determining a plurality of interfering sectors with respect to the serving sector for the mobile station, wherein each of the interfering sectors has a broadcast channel strength;

selecting a sub-set of interfering sectors from among the plurality of interfering sectors, where the sub-set of interfering sectors is less than or equal to the plurality of interfering sectors;

calculating an aggregate sum of corresponding signal strength measurements for the sub-set of interfering sectors, wherein the aggregate sum of corresponding signal strength measurements for the sub-set of interfering sectors is calculated using the following eguation:

$$I_{agg} = \sum_{i=1}^{k} I_i$$

where k is the sub-set of interfering sectors and $I_i$ is the broadcast channel strength level of the $i_{th}$ interfering sector;
   selecting a physical channel rate for the mobile station based on the aggregate sum of corresponding signal strength measurements for the sub-set of interfering sectors; and
   assigning a physical channel to the mobile station on a prioritized basis with respect to the selected physical channel rate.

2. The method defined in claim 1, further comprising:
selecting a physical channel rate for the mobile station based on the aggregate sum of corresponding signal strength measurements for the sub-set of interfering sectors.

3. The method defined in claim 2, wherein the physical channel rate is selected using the following equation:

$$\text{Rate} = \begin{cases} FR, & \dfrac{C}{I_{agg}} < T_2^{FR} \text{ and } N_{FR} > 0 \\ HR, & T_2^{FR} \leq \dfrac{C}{I_{agg}} < T_2^{HR} \text{ and } N_{HR} > 0 \\ QR, & \text{otherwise} \end{cases}$$

where FR is a full rate channel, HR is a half rate channel, QR is a quarter rate channel, $I_{agg}$ is the aggregate sum, C is the broadcast channel strength of the serving sector, $T_2^{FR}$ is a first threshold and $T_2^{HR}$ is a second threshold, $N_{FR}$ is the number of idle full rate channels and $N_{HR}$ is the number of idle half-rate channels in the serving sector.

4. The method defined in claim 3, wherein the aggregate sum of corresponding signal strength measurements for the sub-set of interfering sectors is calculated using the following equation:

$$I_{agg} = \sum_{i=1}^{k} w_i I_i$$

where k is the sub-set of interfering sectors, $I_i$ is the broadcast channel strength level of the i-th interfering sector and w is a weight.

5. The method defined in claim 1, further comprising:
determining whether the number of received broadcast channel measurements for the plurality of interfering sectors exceeds a predetermined threshold.

6. A method of assigning a physical channel rate to a mobile station in a wireless communication network including a plurality of sectors having full rate, half rate and quarter rate traffic channels, the method comprising:
receiving the broadcast channel strength of a serving sector for the mobile station;
determining a plurality of interfering sectors with respect to the serving sector for the mobile station, wherein each interfering sector has a broadcast channel strength;
selecting a sub-set of interfering sectors from among the plurality of interfering sectors, where the sub-set of interfering sectors is less than or equal to the plurality of interfering sectors;
determining a co-channel interference estimate based on the sub-set of interfering sectors, wherein the co-channel interference estimate is determined by selecting the dominant reported interferer from among the sub-set of interfering sectors;
selecting a physical channel rate for the mobile station based on the co-channel interference estimate; and
assigning a physical channel to the mobile station on a prioritized basis with respect to the selected physical channel rate.

7. The method defined in claim 6, wherein the co-channel interference estimate is determined by calculating the average broadcast channel strength level of the sub-set of interfering sectors.

8. The method defined in claim 6, wherein the co-channel interference estimate is determined by selecting the median broadcast channel strength level of the sub-set of interfering sectors.

9. The method defined in claim 6, wherein the physical channel rate is selected using the following equation:

$$\text{Rate} = \begin{cases} FR, & \dfrac{C}{I_{est}} < T_3^{FR} \text{ and } N_{FR} > 0 \\ HR, & T_2^{FR} \leq \dfrac{C}{I_{est}} < T_2^{HR} \text{ and } N_{HR} > 0 \\ QR, & \text{otherwise} \end{cases}$$

where FR is a full rate channel, HR is a half rate channel, QR is a quarter rate channel, $I_{est}$ is the interference estimate, C is the broadcast channel strength of the serving sector, $T_3^{FR}$ is a first threshold and $T_3^{HR}$ is a second threshold, $N_{FR}$ is the number of idle full rate channels and $N_{HR}$ is the number of idle half-rate channels in the serving sector.

10. The method defined in claim 9, wherein the co-channel interference estimate is determined by selecting the dominant reported interferer from among the sub-set of interfering sectors.

11. The method defined in claim 9, wherein the co-channel interference estimate is determined by calculating the average broadcast channel strength level of the sub-set of interfering sectors.

12. The method defined in claim 9, wherein the co-channel interference estimate is determined by selecting the median broadcast channel strength level of the sub-set of interfering sectors.

* * * * *